US010356252B2

(12) United States Patent
Koyama

(10) Patent No.: US 10,356,252 B2
(45) Date of Patent: Jul. 16, 2019

(54) IMAGE READING APPARATUS, IMAGE FORMING APPARATUS, IMAGE READING METHOD, AND NON-TRANSITORY STORAGE MEDIUM THAT GENERATE ABNORMAL PIXEL INFORMATION BASED ON RECEIVED INFORMATION

(71) Applicant: CANON KABUSHIKI KAISHA, Tokyo (JP)

(72) Inventor: Hayato Koyama, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/602,148

(22) Filed: May 23, 2017

(65) Prior Publication Data

US 2017/0353611 A1    Dec. 7, 2017

(30) Foreign Application Priority Data

Jun. 1, 2016 (JP) ................... 2016-110123

(51) Int. Cl.
*H04N 1/04* (2006.01)
*H04N 1/00* (2006.01)
(Continued)

(52) U.S. Cl.
CPC ......... *H04N 1/00037* (2013.01); *G03G 15/55* (2013.01); *G03G 15/60* (2013.01);
(Continued)

(58) Field of Classification Search
CPC ........... H04N 1/00037; H04N 1/00408; H04N 1/00602; H04N 1/00795; H04N 1/4092; G03G 15/602; G03G 15/55; G03G 15/60
(Continued)

(56) References Cited

U.S. PATENT DOCUMENTS 7,688,483 B2 *  3/2010  Okada ................. H04N 1/1013
                                                        358/406
8,693,068 B2    4/2014  Sakai et al.
(Continued)

FOREIGN PATENT DOCUMENTS

CN     103024241 A    4/2013
CN     103227887 A    7/2013
(Continued)

OTHER PUBLICATIONS

Office Action (with English translation) dated Mar. 12, 2019, issued in corresponding Chinese Patent Application No. 201710387193.4.

*Primary Examiner* — Cheukfan Lee
(74) *Attorney, Agent, or Firm* — Venable LLP

(57) ABSTRACT

An image reading apparatus includes a reading unit line sensors to read an image of a target object, and a detector to detect foreign matter at a reading position. The line sensors receive light of a first color and light of a second color different from the first color. The detector includes an abnormal pixel detector to detect a first abnormal pixel for the first color based on first pixel data and second pixel data, and to detect a second abnormal pixel for the second color based on third pixel data and fourth pixel data. A combining unit generates combined abnormal pixel information. A determination unit determines one of a presence and an absence of foreign matter based on the combined abnormal pixel information.

12 Claims, 12 Drawing Sheets

(51) Int. Cl.
*G03G 15/00* (2006.01)
*H04N 1/409* (2006.01)
*H04N 1/401* (2006.01)

(52) U.S. Cl.
CPC ....... *G03G 15/602* (2013.01); *H04N 1/00408* (2013.01); *H04N 1/00602* (2013.01); *H04N 1/00795* (2013.01); *H04N 1/401* (2013.01); *H04N 1/4092* (2013.01)

(58) Field of Classification Search
USPC ................ 358/505, 514, 512, 513, 521, 522
See application file for complete search history.

(56) References Cited

U.S. PATENT DOCUMENTS

| | | | |
|---|---|---|---|
| 8,970,914 B2 | 3/2015 | Kuno et al. | |
| 9,066,053 B1* | 6/2015 | Hyoki | H04N 1/6036 |
| 10,129,415 B2* | 11/2018 | Morikawa | H04N 1/00037 |
| 10,230,854 B2* | 3/2019 | Morikawa | H04N 1/00037 |
| 2001/0021042 A1* | 9/2001 | Hirota | H04N 1/3935 358/505 |
| 2005/0174617 A1* | 8/2005 | Hosier | H04N 1/486 358/514 |
| 2005/0280867 A1* | 12/2005 | Arai | H04N 1/00013 358/2.1 |
| 2007/0076274 A1* | 4/2007 | Higashitani | H04N 1/00002 358/504 |
| 2010/0309530 A1* | 12/2010 | Kamei | H04N 1/00002 358/474 |
| 2011/0188092 A1* | 8/2011 | Fukutome | H04N 1/40 358/461 |
| 2011/0242628 A1* | 10/2011 | Morikawa | H04N 1/12 358/504 |
| 2017/0180580 A1* | 6/2017 | Tanaka | H04N 1/00803 |
| 2017/0331984 A1* | 11/2017 | Akagi | H04N 1/00013 |
| 2017/0353611 A1 | 12/2017 | Koyama | |
| 2017/0353612 A1* | 12/2017 | Morikawa | H04N 1/00037 |

FOREIGN PATENT DOCUMENTS

| | | |
|---|---|---|
| CN | 107454280 A | 12/2017 |
| JP | 62-049765 A | 3/1987 |
| JP | H08-116402 A | 5/1996 |
| JP | 2005-045462 A | 2/2005 |
| JP | 2007-135096 A | 5/2007 |

\* cited by examiner

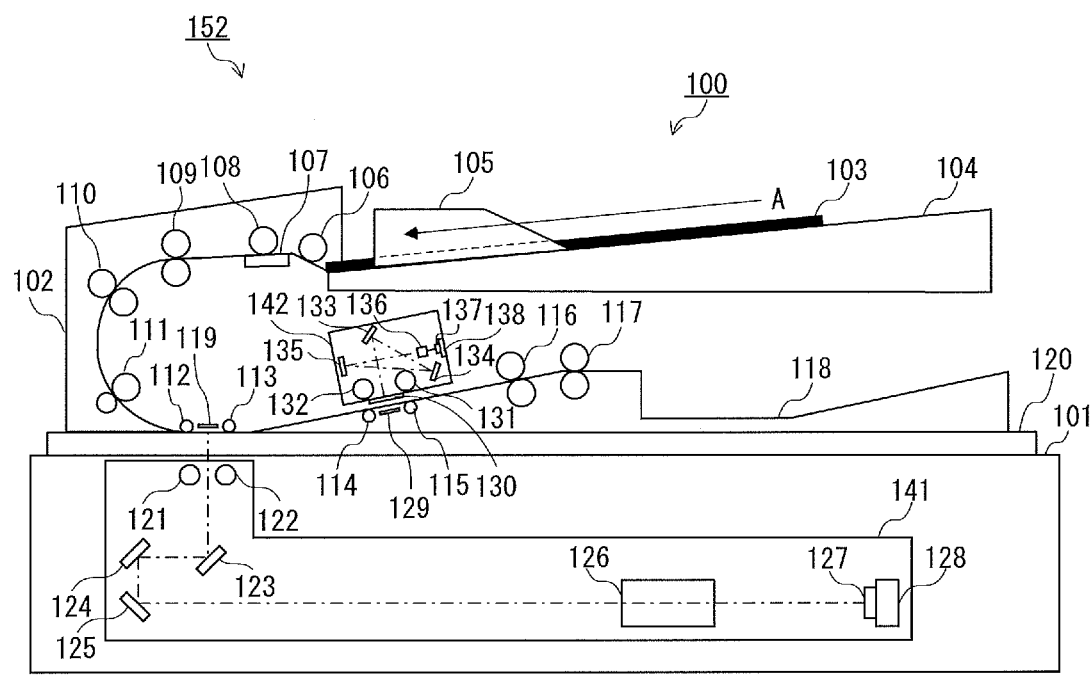
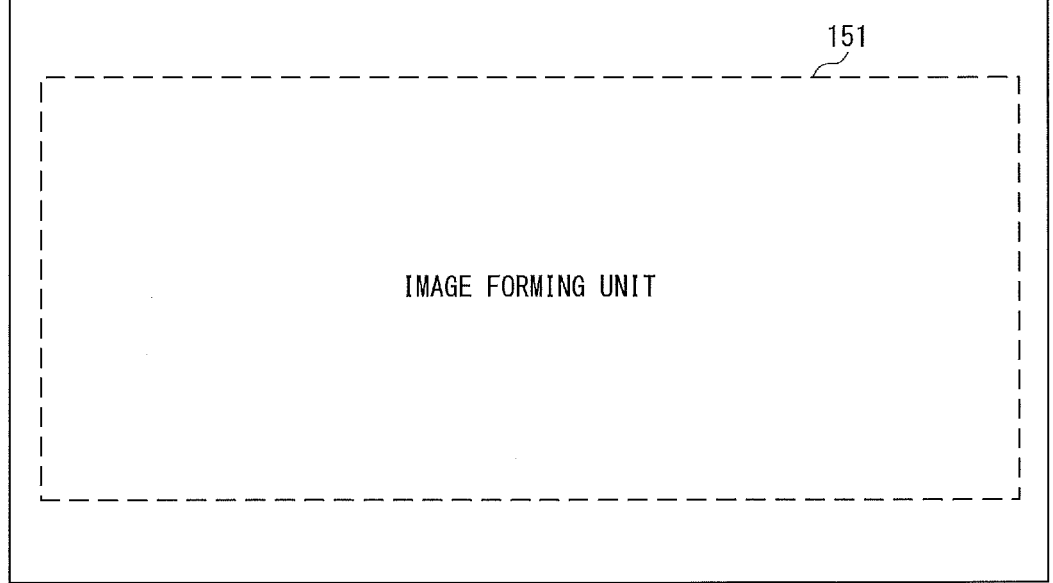
FIG. 1

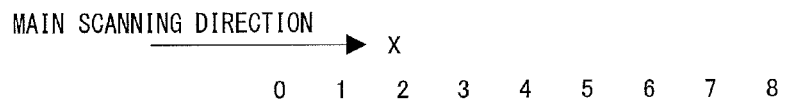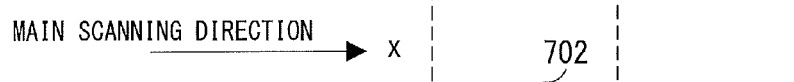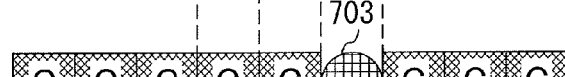

IMAGE READING APPARATUS, IMAGE FORMING APPARATUS, IMAGE READING METHOD, AND NON-TRANSITORY STORAGE MEDIUM THAT GENERATE ABNORMAL PIXEL INFORMATION BASED ON RECEIVED INFORMATION

CLAIM TO PRIORITY

This application claims the benefit of Japanese Patent Application No. 2016-110123, filed Jun. 1, 2016 which is hereby incorporated by reference herein in its entirety.

BACKGROUND OF THE INVENTION

Field of the Invention

The present invention relates to an image reading apparatus configured to effectively detect, when reading an image of a target object, foreign matter that may cause an abnormal pixel that does not exist in the image.

Description of the Related Art

An image reading apparatus including an automatic document feeder (hereafter referred to as an "ADF") is capable of reading an image of an original at a predetermined reading position while continuously conveying originals, sheet by sheet. In this case, the reading position of the image is fixed. It is possible to achieve high-speed image reading by conveying the original at a high speed. The conveyance of the original may cause dust (foreign matter or foreign materials), for example, paper powder, particles, or specks, to adhere to the reading position. The foreign matter adhering to the reading position becomes a cause of a defect of the read image. For example, a streaked image occurs in the read image due to the foreign matter.

An image reading apparatus disclosed in Japanese Patent Application Laid-Open No. 2005-45462 is configured to acquire read data obtained when an original does not exist at a reading position, to read data obtained by reading a leading edge portion and a trailing edge portion of the original, and to read data obtained by reading the original excluding the leading edge portion and the trailing edge portion, and to detect an abnormal pixel due to the foreign matter that does not exist in the original image. In the above-mentioned image reading apparatus, when a pixel having the same density at a specific position along a main scanning direction at a time of the reading exists in the respective pieces of read data that have been acquired, the pixel is detected as the abnormal pixel. An image reading apparatus described in Japanese Patent Application Laid-Open No. 2007-135096 is configured to conduct image correction in a case when the width of a detected streaked image is equal to or smaller than a predetermined value based on a result of detecting an abnormal pixel, and to prompt a user to clean the image reading apparatus by displaying an alert in a case when the predetermined value is exceeded.

Some image reading apparatus include a reading sensor including a plurality of light receiving element arrays for the respective colors of red (R), green (G), and blue (B). The light receiving element arrays are each obtained by arranging photoelectric conversion elements configured to receive light of the same color in a line. Other image reading apparatus include such a reading sensor as disclosed in Japanese Patent Application Laid-Open No. 62-49765 or Japanese Patent Application Laid-Open No. 8-116402. In Japanese Patent Application Laid-Open No. 62-49765 and Japanese Patent Application Laid-Open No. 8-116402, there are disclosed reading sensors each including light receiving element arrays each obtained by arranging photoelectric conversion elements configured to receive light of different colors in a line, and the number of the light receiving element arrays is the same as the number of colors to be received. Each of the light receiving element arrays is formed by arranging three kinds of photoelectric conversion elements configured to receive the light of R, G, and B so that adjacent elements receive the light of different colors. The photoelectric conversion elements located in the same position along a direction of arranging the light receiving element arrays are also arranged so as to receive light of different colors for the respective light receiving element arrays.

FIG. 12A and FIG. 12B are explanatory diagrams of reading results obtained by an image reading apparatus. FIG. 12A is an illustration of the reading result obtained by the reading sensor including three lines of light receiving element arrays each obtained by arranging photoelectric conversion elements configured to receive light of the same color in a line. FIG. 12B is an illustration of the reading result obtained by the reading sensor including three lines of light receiving element arrays each obtained by arranging photoelectric conversion elements configured to receive light of different colors in a line. In each of FIG. 12A and FIG. 12B, foreign matter adheres to a reading position on the middle light receiving element array. The foreign matter affects a reading result. In FIG. 12A, one streaked image having a width of seven pixels occurs in the read data on green (G) due to the foreign matter. In FIG. 12B, a total of seven streaked images each having a width of one pixel occur in the read data on the respective colors of R, G, and B due to the foreign matter. The streaked image is represented by a value of "1" of flags (flag_r, flag_g, and flag_b).

In this manner, in FIG. 12B, separate streaked images corresponding to a plurality of colors occur due to one foreign matter. When separate streaked images occur, there are advantages that accuracy in detection of an abnormal pixel improves, and that a correction trace of the abnormal pixel becomes inconspicuous. However, the separate streaked images corresponding to a plurality of colors have different sizes and numbers of foreign matters that caused the separate streaked images. Therefore, the sizes and numbers of foreign matters cannot be accurately grasped based on the streaked images. When an alert is displayed based on the width (size) of the streaked image as in Japanese Patent Application Laid-Open No. 2007-135096, an alert is displayed in the case of FIG. 12A when the width is equal to or larger than a predetermined width, while an alert is not displayed in the case of FIG. 12B when the width is smaller than the predetermined width. In an extreme case, even when foreign matter having a size of one line adheres, the streaked images all having the width of one pixel appear, and thus, an alert is not displayed. In this manner, there is a case when an adhering state of a foreign matter differs from the result of detecting a streaked image or other such abnormal pixel that has caused an abnormality, and an alert is not issued normally even when a foreign matter supposed to be removed through cleaning adheres. Therefore, there is a demand for an image reading apparatus configured to detect foreign matter accurately when employing a reading sensor including three lines of light receiving element arrays, each obtained by arranging photoelectric conversion elements configured to receive light of different colors in a line.

SUMMARY OF THE INVENTION

An image reading apparatus according to the present disclosure includes a reading unit having first and second line sensors and configured to read an image of a target object, a detector configured to detect foreign matter at a reading position of the reading unit, wherein the first line sensor having one or more first light receiving elements and one or more second light receiving elements being arranged in a first direction, the first light receiving element configured to receive light of a first color and the second light receiving element configured to receive light of a second color that is different from the first color, the second line sensor having one or more third light receiving element and one or more fourth light receiving elements being arranged in the first direction, the third light receiving element configured to receive light of the first color and the fourth light receiving element configured to receive light of the second color, the first line sensor and the second line sensor being arranged at a predetermined interval in a second direction orthogonal to the first direction, and the detector comprises an abnormal pixel detector configured to detect a first abnormal pixel for the first color based on first pixel data from the first light receiving elements and second pixel data from the third light receiving elements, and configured to detect a second abnormal pixel for the second color based on third pixel data from the second light receiving elements and fourth pixel data from the fourth light receiving elements, a combining unit configured to generate combined abnormal pixel information obtained by combining the first and second abnormal pixel, and a determination unit configured to determine one of presence and absence of the foreign matter based on the combined abnormal pixel information.

Further features of the present invention will become apparent from the following description of exemplary embodiments (with reference to the attached drawings).

BRIEF DESCRIPTION OF THE DRAWINGS

FIG. 1 is an overall configuration diagram of an image forming system.

FIG. 6A, FIG. 6B, FIG. 6C, and FIG. 6D are explanatory diagrams of abnormal pixel counting.

DESCRIPTION OF THE EMBODIMENTS

Figure 2A:
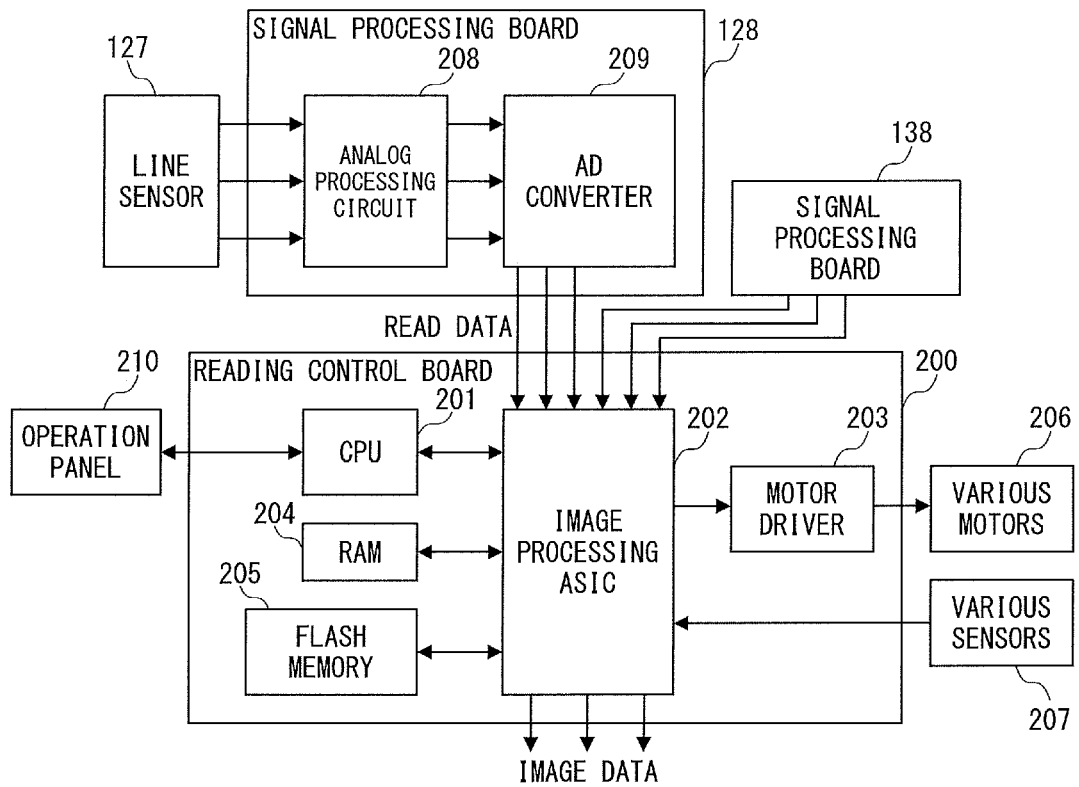
FIG. 2A and FIG. 2B are configuration diagrams of a control system.

An embodiment of the present invention is described below in detail with reference to the drawings.

Overall Configuration

FIG. 1 is an overall configuration diagram of an image forming system according to this embodiment. The image forming system is achieved by, for example, a digital color multifunction peripheral or a multifunction peripheral (MFP).

An image forming system 152 includes an image reading apparatus 100 and an image forming apparatus 150. The image forming apparatus 150 includes an image forming unit 151 configured to form an image by a known electrophotographic printing method. The image forming unit 151 includes a photosensitive member, an exposure device, a developing device, a transfer unit, and a fixing device. The exposure device is configured to form an electrostatic latent image on the photosensitive member based on image data generated by the image reading apparatus 100 reading an original 103. The developing device is configured to form a developer image on the photosensitive member by developing the electrostatic latent image formed on the photosensitive member by a developer. The transfer unit is configured to transfer the developer image formed on the photosensitive member onto a predetermined recording medium. The fixing device is configured to fix the developer image transferred onto the recording medium to the recording medium. With the above-mentioned configuration, the image forming unit 151 forms an image corresponding to the image data on the recording medium.

Configuration of Image Reading Apparatus

The image reading apparatus 100 is configured to read an original image from the original 103 being a target object of image reading. To that end, the image reading apparatus 100 includes a reader unit 101 and an ADF 102 being an automatic original feeding device configured to feed the original 103. The reader unit 101 includes a first reading unit 141 configured to read the original image from one surface (front surface) of the original 103 at a first reading position. The ADF 102 includes a second reading unit 142 configured to read the original image from the other surface (back surface) of the original 103 at a second reading position. A reading glass 120 is provided on the reader unit 101. The ADF 102 is provided on the reading glass 120. The ADF 102 includes an original tray 104 configured to have the original 103 placed thereon. The original tray 104 includes width regulating plates 105 configured to regulate the original 103 in a direction (depth direction of FIG. 1) perpendicular to a conveyance direction (arrow A). Two width regulating plates 105 are provided so as to sandwich the original 103 placed on the original tray 104, and are configured to suppress skew feeding of the original 103. The original tray 104 allows a plurality of originals 103 to be placed thereon.

The original 103 has the image read while being conveyed from the original tray 104 along a conveyance route. On the conveyance route, in order to convey the original 103 to the first reading position, there are provided a pickup roller 106, a separation pad 107, a separation roller 108, first registration rollers 109, second registration rollers 110, first conveyance rollers 111, and second conveyance rollers 112. On the conveyance route, in order to deliver the original 103 from the first reading position to the delivery tray 118 through the second reading position, there are also provided a third conveyance roller 113, a fourth conveyance roller 114, a fifth conveyance roller 115, sixth conveyance rollers 116, and delivery rollers 117.

The pickup roller 106 is configured to convey the original 103 placed on the original tray 104 to a separator formed of the separation pad 107 and the separation roller 108. The separator is configured to separate a plurality of originals 103 sheet by sheet in order from the top of a stack of the plurality of originals 103 by the separation pad 107 and the separation roller 108. The first registration rollers 109 are configured to correct the skew feeding of one original 103 separated by the separator. The original 103 is conveyed to the first reading position through the second registration rollers 110, the first conveyance rollers 111, and the second conveyance rollers 112 in the stated order. The first reading position is set between the second conveyance rollers 112 and the third conveyance roller 113. The original 103 has the original image on one surface read by the first reading unit 141 while passing through the first reading position.

The third conveyance roller 113 is configured to convey the original 103, which has passed through the first reading position, to the second reading position. The second reading position is set between the fourth conveyance roller 114 and the fifth conveyance roller 115. The fourth conveyance roller 114 is configured to convey the original 103, which has been conveyed by the third conveyance roller 113, to the second reading position. The original 103 has the original image on the other surface read by the second reading unit 142 while passing through the second reading position. The fifth conveyance roller 115 is configured to convey the original 103, which has passed through the second reading position, to the sixth conveyance rollers 116. The sixth conveyance rollers 116 are configured to convey the original 103, which has been conveyed by the fifth conveyance roller 115, to the delivery rollers 117. The delivery rollers 117 are configured to deliver the original 103, which has been conveyed by the sixth conveyance rollers 116, to an original delivery tray 118.

The first reading unit 141 and the second reading unit 142 have the same configuration.

The first reading unit 141 includes light sources 121 and 122, reflective mirrors 123, 124, and 125, an imaging lens 126, a line sensor 127, including a light receiving element array, and a signal processing board 128. A white opposing member 119 is provided at a position opposed to the first reading unit 141 across the first reading position. The original 103, which has been conveyed to the first reading position, passes through a position between the white opposing member 119 and the reading glass 120. The first reading unit 141 is configured to cause the light sources 121 and 122 to apply light to the original 103 passing through the first reading position. The original 103 reflects the applied light. The reflected light is guided to the imaging lens 126 through the reflective mirrors 123, 124, and 125. The imaging lens 126 is configured to image the reflected light onto a light receiving surface of the line sensor 127. The line sensor 127 is configured to input an electrical signal, which is an analog signal corresponding to the reflected light received on the light receiving surface, to the signal processing board 128. The signal processing board 128 is configured to process the electrical signal input from the line sensor 127 to generate read data being a digital signal representing the image on the front surface of the original 103.

The second reading unit 142 includes light sources 131 and 132, reflective mirrors 133, 134, and 135, an imaging lens 136, a line sensor 137 including a light receiving element array, and a signal processing board 138. A white opposing member 129 and a back surface reading glass 130 are provided at the second reading position. The original 103, which has been conveyed to the second reading position, passes through a position between the white opposing member 129 and the back surface reading glass 130. The second reading unit 142 is configured to cause the light sources 131 and 132 to apply light to the original 103 passing through the second reading position. The original 103 reflects the applied light. The reflected light is guided to the imaging lens 136 through the reflective mirrors 133, 134, and 135. The imaging lens 136 is configured to image the reflected light onto a light receiving surface of the line sensor 137. The line sensor 137 is configured to input an electrical signal, which is an analog signal corresponding to the reflected light received on the light receiving surface, to the signal processing board 138. The signal processing board 138 is configured to process the electrical signal input from the line sensor 137 to generate read data being a digital signal representing the image on the back surface of the original 103.

The light sources 121, 122, 131, and 132 are formed by arranging a plurality of light emitting elements, for example, light emitting diodes (LEDs). The plurality of light emitting elements are arranged in a direction perpendicular to the conveyance direction of the original 103. The line sensors 127 and 137 each include a light receiving element array forming a line by arranging a plurality of light receiving elements (photoelectric conversion elements). The light receiving element is a complementary metal oxide semiconductor (CMOS) sensor, a charge coupled device (CCD) sensor, or the like. The light receiving element array is arranged in the same direction as a direction of arranging the light emitting elements. The direction of arranging the light receiving element array corresponds to a main scanning direction of the first reading unit 141 and the second reading unit 142.

The line sensors 127 and 137 of this embodiment each include a plurality of light receiving element arrays each obtained by arranging a plurality of light receiving elements configured to receive light of different colors, which is described later in detail. For example, a light receiving element configured to receive the light of R (first color), a light receiving element configured to receive the light of G (second color), and a light receiving element configured to receive the light of B (third color) are arranged in one line. Adjacent ones of the light receiving elements receive the light of different colors. In the line sensors 127 and 137, the above-mentioned plurality of light receiving element arrays are arranged in a sub-scanning direction perpendicular to the main scanning direction. In this embodiment, three light receiving element arrays are arranged in the sub-scanning direction. The light receiving element arrays are arranged so that the light receiving elements adjacent in the sub-scanning direction receive the light of different colors as well.

The first reading unit 141 is used to read the image of the front surface of the original 103 at the first reading position and to read the image of the original 103 placed on the reading glass 120. In order to read the image of the original 103 placed on the reading glass 120, the light sources 121 and 122 and the reflective mirrors 123, 124, and 125 of the first reading unit 141 are moved in the left-right direction of FIG. 1. Therefore, the light sources 121 and 122 and the reflective mirrors 123, 124, and 125 are integrally formed.

Control System of Image Reading Apparatus 100

Figure 2B:
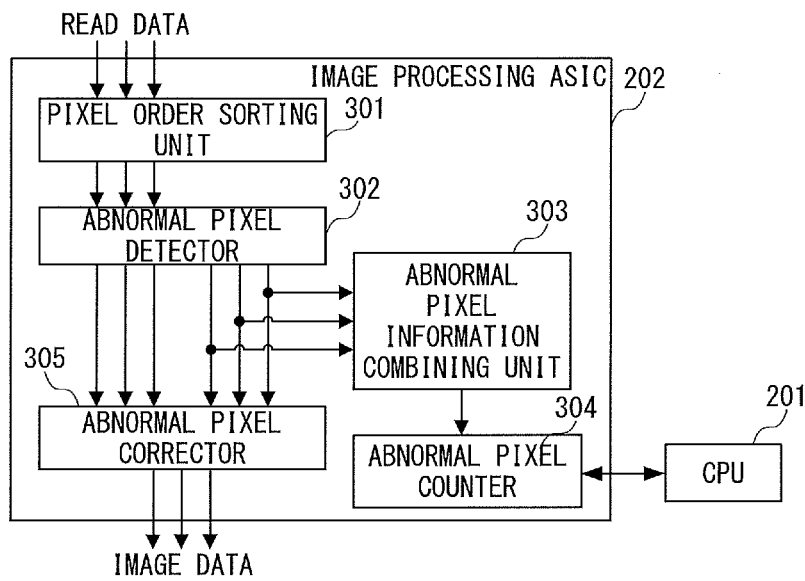

FIG. 2A and FIG. 2B are configuration diagrams of a control system for controlling an operation of the image reading apparatus 100. FIG. 2A is the configuration diagram of the control system. The control system includes the signal processing boards 128 and 138, which are provided to the first reading unit 141 and the second reading unit 142, respectively, and a reading control board 200. The reading control board 200 is built into the image reading apparatus 100, and is capable of communicating to/from the image forming apparatus 150. The signal processing board 128 and the signal processing board 138 have the same configuration. Therefore, in FIG. 2A and FIG. 2B, the configuration of the signal processing board 138 is illustrated in a simplified manner.

The signal processing board 128 includes an analog processing circuit 208 and an AD converter 209. The analog processing circuit 208 is configured to acquire an electrical signal from the line sensor 127. As described above, the line sensor 127 is configured to receive the reflected light from the original 103 on the light receiving surface, and to output the electrical signal being the analog signal obtained by photoelectrically converting the received reflected light. The electrical signal has a value corresponding to a reflected light amount. The analog processing circuit 208 is configured to subject the acquired electrical signal to analog processing, for example, offset adjustment or gain adjustment. The analog processing circuit 208 transmits the electrical signal subjected to the analog processing to the AD converter 209. The AD converter 209 is configured to convert the electrical signal acquired from the analog processing circuit 208 into the read data being the digital signal. The AD converter 209 is configured to transmit the generated read data to the reading control board 200. In the same manner as the signal processing board 128, the signal processing board 138 is configured to generate the read data being the digital signal from the electrical signal being the analog signal output from the line sensor 137, and to transmit the read data to the reading control board 200.

The reading control board 200 is connected to an operation panel 210, various motors 206 included in the image reading apparatus 100, and various sensors 207 included in the image reading apparatus 100. The operation panel 210 is a user interface to be operated by a user. The operation panel 210 is used for not only input to the reading control board 200, but also, display of a message for the user or other such purpose. To that end, the operation panel 210 includes input/output devices, for example, an input button, a touch panel, and a display. The reading control board 200 is configured to execute reading processing or other such processing based on a signal input from the operation panel 210. The reading control board 200 is configured to conduct drive control for the various motors 206 based on detection results obtained by the various sensors 207, and to conduct the reading processing for an original image.

The reading control board 200 is a computer system including a central processing unit (CPU) 201, an image processing application specific integrated circuit (ASIC) 202, a motor driver 203, a random access memory (RAM) 204 being a volatile memory, and a flash memory 205 being a nonvolatile memory. The RAM 204 is formed of, for example, a synchronous dynamic random access memory (SDRAM). The CPU 201 is configured to read a computer program from the flash memory 205, a read only memory (ROM) (not shown), or other such storage medium, and to execute the computer program with the RAM 204 being used as a work area, to thereby control the operation of the image reading apparatus 100. The CPU 201 is configured to make various operation settings for the image processing ASIC 202.

The image processing ASIC 202 is configured to conduct various kinds of image processing for the read data acquired from the signal processing boards 128 and 138 based on contents of the settings made by the CPU 201. The image processing ASIC 202 is configured to temporarily store the read data in the RAM 204 at a time of the image processing. Various setting values and parameters, which are used when the image processing ASIC 202 conducts the image processing, are stored in the flash memory 205. The image processing ASIC 202 is configured to conduct the image processing by acquiring the setting values and parameters from the flash memory 205 as the need arises.

The reading processing for an original image is started with a trigger of a reading instruction issued through the operation panel 210 or one of the detection results obtained by the various sensors 207. The CPU 201 and the image processing ASIC 202 input control signals for controlling operations of the various motors 206 through the motor driver 203 at a time of the reading processing for an original image. The image processing ASIC 202 conducts the image processing for the read data acquired from the signal processing boards 128 and 138, and generates the image data representing the original image. The image processing ASIC 202 transmits the generated image data to the image forming apparatus 150. The image forming apparatus 150 is capable of conducting the image forming processing based on the image data acquired from the image processing ASIC 202.

FIG. 2B is the configuration diagram of details of the image processing ASIC 202. The image processing ASIC 202 includes a pixel order sorter 301, an abnormal pixel detector 302, an abnormal pixel information combining unit 303, an abnormal pixel counter 304, and an abnormal pixel corrector 305. The image processing ASIC 202 is configured to acquire the read data from both the signal processing boards 128 and 138, but processing for the read data acquired from the signal processing board 128 is described below. The same processing is conducted for the read data acquired from the signal processing board 138.

As described above, the line sensor 127 includes a plurality of light receiving element arrays each obtained by arranging a plurality of light receiving elements configured to receive the light of different colors. Therefore, pieces of data on a plurality of colors are mixed together in the read data corresponding to a light reception result obtained by one of the light receiving element arrays of the line sensor 127. The pixel order sorter 301 is configured to generate, for each color, sorted data obtained by sorting a plurality of pieces of read data output from the respective light receiving element arrays for every pixel of the same color.

The abnormal pixel detector 302 is configured to detect an abnormal pixel that does not exist in the original image based on the sorted data on each color, to thereby generate abnormal pixel information. The "abnormal pixel" occurs when foreign matter, for example, dust, adheres to the reading glass 120 or the back surface reading glass 130. When the position of the dust adhering to the reading glass 120, or the like, corresponds to the reading position of the line sensor 127, the dust affects the read data. In this manner, the "abnormal pixel" is a pixel of an image different from the original image supposed to be read. The abnormal pixel information combining unit 303 is configured to combine pieces of abnormal pixel information on the respective colors generated by the abnormal pixel detector 302, to thereby generate combined abnormal pixel information. The abnormal pixel counter 304 is configured to count the number of sets of the abnormal pixels for each width of the abnormal pixels in the main scanning direction based on the combined abnormal pixel information. A result of the counting is transmitted to the CPU 201. The abnormal pixel corrector 305 is configured to correct the sorted data on each color generated by the pixel order sorter 301 based on the abnormal pixel information on each color generated by the abnormal pixel detector 302, to thereby generate the image data.

Line Sensor

Figure 3A:
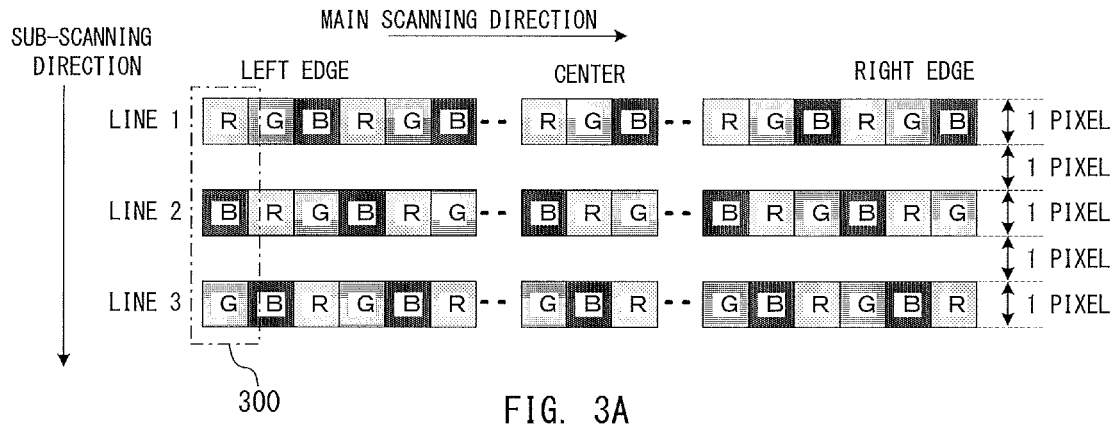
FIG. 3A, FIG. 3B, and FIG. 3C are explanatory diagrams of a line sensor.
Figure 3B:
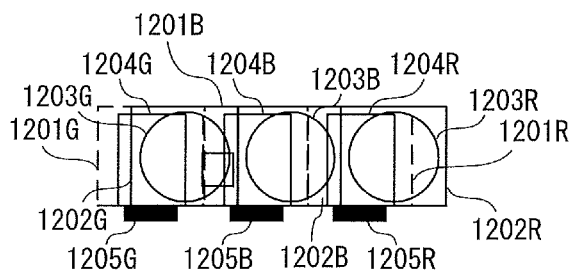
Figure 3C:
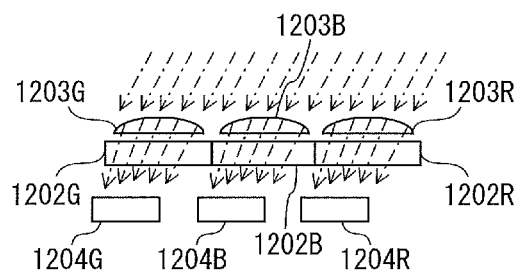

FIG. 3A, FIG. 3B, and FIG. 3C are explanatory diagrams of the line sensors 127 and 137.

FIG. 3A is the explanatory diagram of a structure of the line sensors 127 and 137 in which the light receiving element arrays are arranged. The line sensors 127 and 137 are configured to read 7,500 pixels in the main scanning direction being a first direction, and to read three lines in the sub-scanning direction being a second direction perpendicular to the first direction. The following description is made on the assumption that an image is read with a resolution of 600 dots per inch (dpi) in the main scanning direction, but the resolution is merely an example. The main scanning direction represents a direction in which a plurality of light receiving elements are arranged in a line, and a direction corresponding to a width direction (direction perpendicular to the conveyance direction) of the original at a time of reading the original. The sub-scanning direction represents a direction perpendicular to the main scanning direction, and a direction corresponding to the conveyance direction of the original at the time of reading the original. An array formed of the light receiving element array in the first direction (main scanning direction) is referred to as "line". One line is formed of one light receiving element array. In each of the line sensors 127 and 137, a plurality of lines (in this case, three lines) of the light receiving element arrays each forming one line are arranged at a predetermined interval in the second direction (sub-scanning direction) perpendicular to the first direction (main scanning direction).

Three lines L1 to L3 of the light receiving element arrays are spaced apart from each other at a predetermined interval in the sub-scanning direction, and are arranged so that a leading pixel 300 existing in a cycle of R→G→B has a color different from that of another leading pixel 300 within the adjacent array. In the example of FIG. 3A, the interval between adjacent lines is one pixel. Therefore, the line L1 and the line L2 of the light receiving element arrays are arranged in positions spaced apart from each other by two pixels in the sub-scanning direction, and the line L1 and the line L3 of the light receiving element arrays are arranged in positions spaced apart from each other by four pixels in the sub-scanning direction. The leading pixel 300 of the line L1 has the color of red (R). The leading pixel 300 of the line L2 has the color of green (G) that is different from R by one pixel. The leading pixel 300 of the line L3 has the color of blue (B) that is different from G by one pixel. In short, the colors of the pixels have regularity of R→G→B→R→G→B→ . . . in the main scanning direction. When viewed in the sub-scanning direction, the line L1 and the line L2 are arranged with the above-mentioned regularity being shifted by one pixel in the main scanning direction. The line L1 and the line L3 are arranged with the above-mentioned regularity being shifted by two pixels in the main scanning direction. Therefore, in the line sensors 127 and 137, the respective light receiving elements for R, G, and B are arranged in a so-called staggered shape. In short, first light receiving elements, second light receiving elements, and third light receiving elements are arranged so that light receiving elements configured to detect pixels of the same color are not adjacent to each other. The line sensors 127 and 137 are each configured to detect and to output signals in positions spaced apart from each other by the above-mentioned number of pixels in order to read the original 103.

FIG. 3B and FIG. 3C are configuration diagrams of light receiving elements. Now, a description is made of configurations of a light receiving element 1201R configured to receive red light, a light receiving element 1201B configured to receive blue light, and a light receiving element 1201G configured to receive green light. The light receiving elements 1201R, 1201B, and 1201G each correspond to one pixel, and are normally arranged at regular intervals.

The light receiving element 1201R includes a light transmitting member 1202R configured to transmit light having a predetermined wavelength (wavelength of the red light) as light having a peak transmittance wavelength and an optical semiconductor element 1204R configured to output an electrical signal having a level corresponding to the intensity of the light transmitted through the light transmitting member 1202R. The light receiving element 1201B includes a light transmitting member 1202B configured to transmit light having a predetermined wavelength (wavelength of the blue light) as light having a peak transmittance wavelength and an optical semiconductor element 1204B configured to output an electrical signal having a level corresponding to the intensity of the light transmitted through the light transmitting member 1202B. The light receiving element 1201G includes a light transmitting member 1202G configured to transmit light having a predetermined wavelength (wavelength of the green light) as light having a peak transmittance wavelength and an optical semiconductor element 1204G configured to output an electrical signal having a level corresponding to the intensity of the light transmitted through the light transmitting member 1202G.

The light transmitting members 1202R, 1202B, and 1202G are color filters each configured to transmit a corresponding color (for example, red color for R). The optical semiconductor elements 1204R, 1204B, and 1204G are, for example, photodiodes. The peak transmittance wavelength represents a wavelength with which the filter exhibits the maximum transmittance. Each of the optical semiconductor elements 1204R, 1204B, and 1204G for one pixel is formed to be smaller than the corresponding one of the light transmitting members 1202R, 1202B, and 1202G. The optical semiconductor elements 1204R, 1204B, and 1204G and the light transmitting members 1202R, 1202B, and 1202G are insulated by an interlayer film formed of a silicon oxide or other such insulating material. In a case when the optical semiconductor elements 1204R, 1204B, and 1204G are elements capable of receiving the corresponding colors by themselves, it is unnecessary to provide the light transmitting members 1202R, 1202B, and 1202G.

The light receiving elements 1201R, 1201B, and 1201G include micro lenses 1203R, 1203B, and 1203G, respectively, each configured to condense reflected light. The reflected light condensed by the micro lenses 1203R, 1203G, and 1203B is imaged onto light receiving surfaces of the optical semiconductor elements 1204R, 1204G, and 1204B through the light transmitting members 1202R, 1202G, and 1202B, respectively. The micro lenses 1203R, 1203G, and 1203B are configured so that a stain, or the like, is prevented from adhering thereto by a cover glass (not shown).

The light receiving elements 1201R, 1201B, and 1201G include gate electrodes 1205R, 1205G, and 1205B in the optical semiconductor elements 1204R, 1204G, and 1204B, respectively. The gate electrodes 1205R, 1205G, and 1205B serve as terminals for outputting electrical signals from the optical semiconductor elements 1204R, 1204G, and 1204B, respectively, to the signal processing board 128. The gate electrodes 1205R, 1205G, and 1205B are formed of, for example, polysilicon.

Operation Control of Image Reading Apparatus 100

Figure 4:
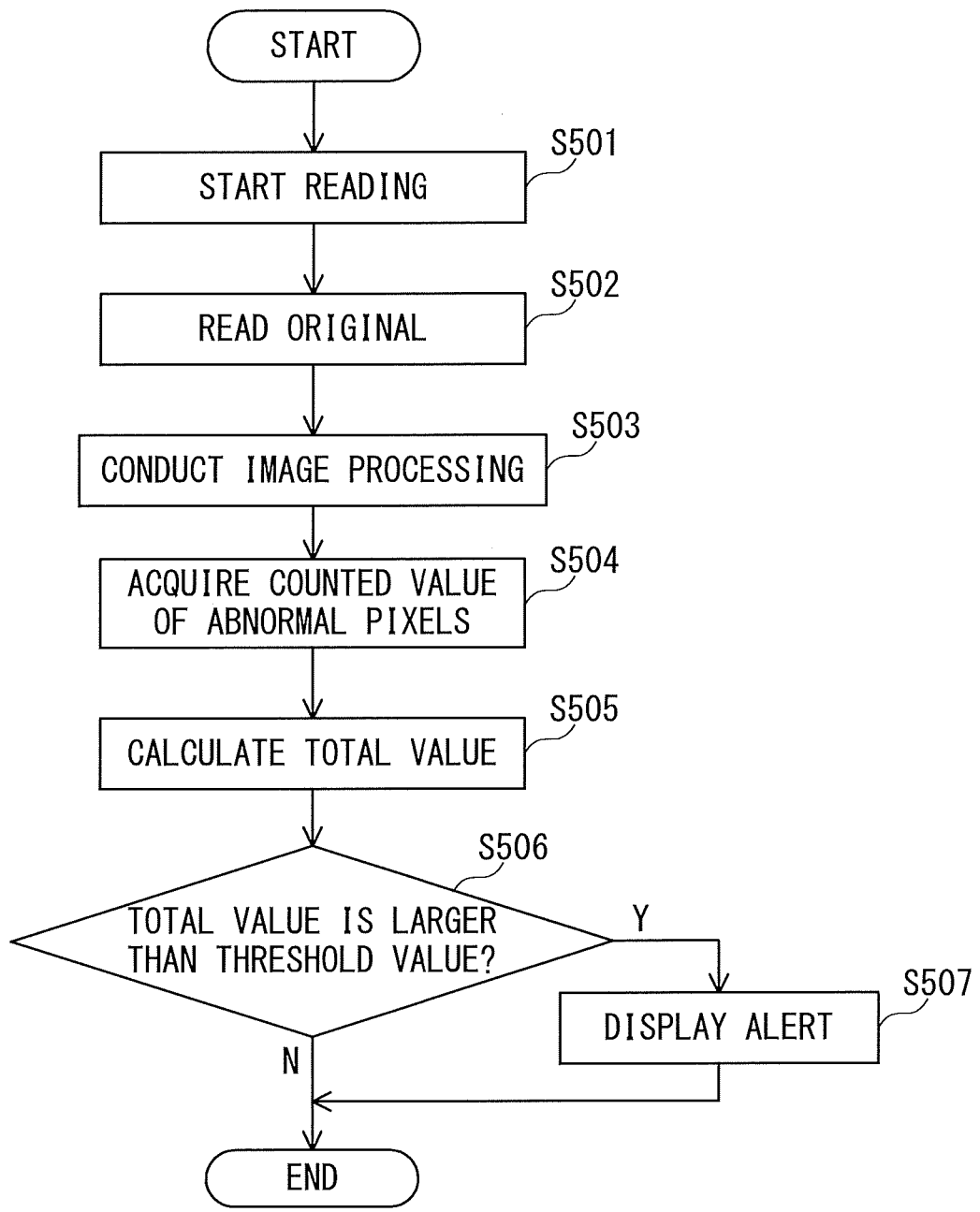
FIG. 4 is a flowchart for illustrating reading processing for an original image.

FIG. 4 is a flowchart for illustrating the reading processing for an original image that is conducted by the image reading apparatus 100 having such a configuration. In the reading processing, the image reading apparatus 100 alerts the user with a request to clean foreign matter or other such request based on how an abnormal pixel has occurred. Now, a description is made of a case when an original image on one surface of the original 103 is read by the first reading unit 141. In order to read original images on both sides of the original 103, the second reading unit 142 also conducts processing in the same manner as the first reading unit 141.

The CPU 201 acquires an instruction to start reading from the operation panel 210, and starts reading the original image (Step S501). After starting to read the original image, the CPU 201 first causes the motor driver 203 to control the operations of the various motors 206 to convey the original 103 from the original tray 104 to the first reading position. The CPU 201 causes the first reading unit 141 to read the original image from the conveyed original 103. The original 103, from which the original image has been read, is delivered to the original delivery tray 118 (Step S502). The line sensor 127 of the first reading unit 141 transmits, to the signal processing board 128, an electrical signal being an analog signal that is based on the read original image. The signal processing board 128 generates read data being a digital signal based on the input electrical signal. The signal processing board 128 transmits the generated read data to the reading control board 200.

The CPU 201 causes the image processing ASIC 202 to conduct the image processing for the input read data, the image processing including detection of an abnormal pixel, correction of the abnormal pixel, and counting of the abnormal pixels (Step S503). The image processing conducted by the image processing ASIC 202 is described later in detail. The CPU 201 acquires the count value of the abnormal pixels from the image processing ASIC 202 (Step S504). For example, the count value of the abnormal pixels is expressed as follows;

the number of abnormal pixels having a one-pixel width . . . sjnum[1]

the number of abnormal pixels having a two-pixel width . . . sjnum[2]

. . .

the number of abnormal pixels having a width equal to or larger than a twenty-pixel width . . . sjnum[20].

In this embodiment, the numbers of abnormal pixels having widths equal to or larger than a twenty-pixel width are collectively counted as one value, but its upper limit value is not necessarily twenty pixels. The pixel width represents the number of pixels in the main scanning direction.

The CPU 201 calculates a total value of the acquired count values of the abnormal pixels (Step S505). The CPU 201 calculates the total value through the use of only the count values having a pixel width equal to or greater than a predetermined pixel width. With this processing, it is possible to inhibit an alert from being excessively displayed due to relatively small abnormal pixels that can be handled through the correction. When a predetermined pixel width is set to "w", a total value sjsum is calculated by the following expression.

$$sjsum = \Sigma_{i=w}^{i=20} sjnum[i]$$

The CPU 201 compares the calculated total value with a predetermined threshold value (Step S506). The CPU 201 determines the presence or absence of foreign matter at the reading position based on the comparison. In a case when the total value is greater than the threshold value (Y in Step S506), the CPU 201 determines that foreign matter that needs to be removed adheres to the first reading position. In this case, the CPU 201 displays an alert to prompt the user to clean the first reading position through the operation panel 210 (Step S507), and brings the image reading processing to an end. In a case when the total value is equal to or lesser than the threshold value (N in Step S506), the CPU 201 determines that no foreign matter that needs to be removed adheres to the first reading position. In this case, the CPU 201 transmits the image data from the image processing ASIC 202 to the image forming apparatus 150, and brings the image reading processing to an end.

Figure 5:
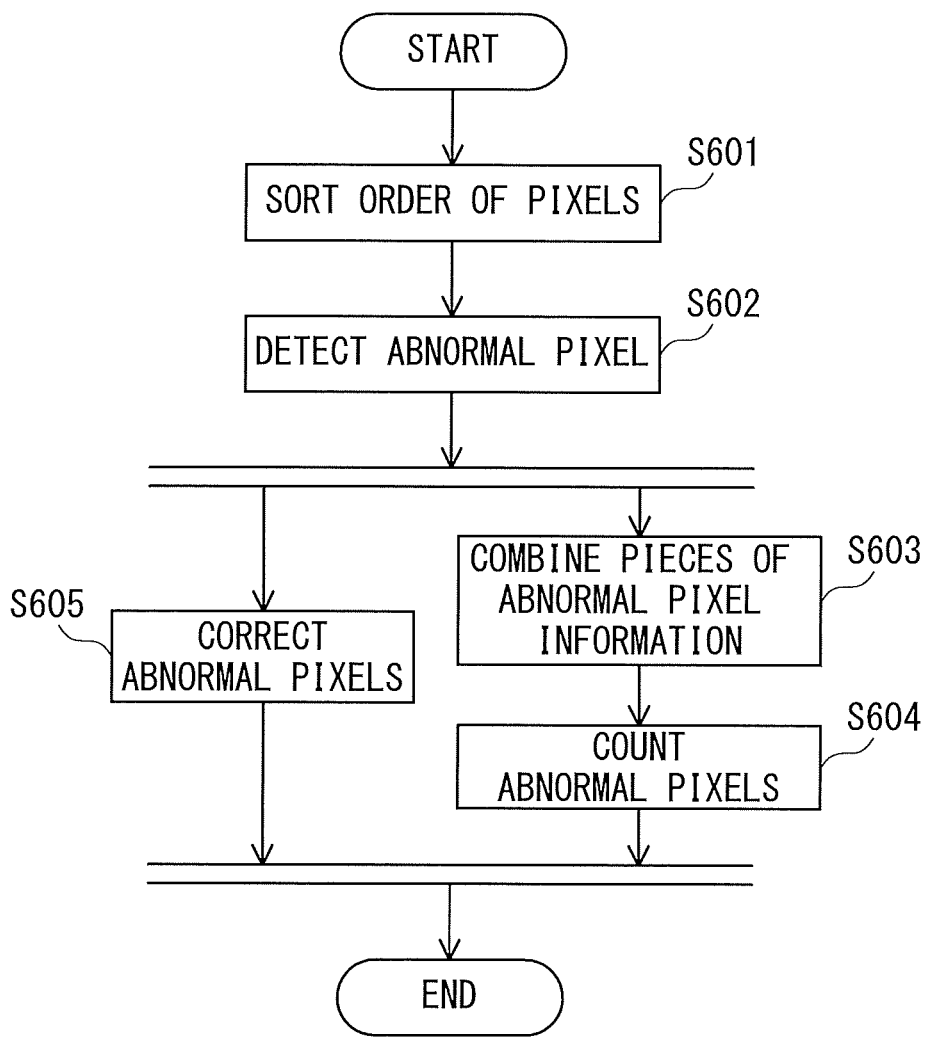
FIG. 5 is a flowchart for illustrating image processing.

With reference to FIG. 5 to FIG. 7, a description is made of the image processing conducted by the image processing ASIC 202 in Step S503. FIG. 5 is a flowchart for illustrating the image processing. The image processing ASIC 202 acquires the read data by the pixel order sorter 301, and conducts the image processing for the read data.

The pixel order sorter 301 of the image processing ASIC 202 sorts the order of pixels of the acquired read data (Step S601). As described above, the line sensors 127 and 137 receive light of a plurality of colors by one light receiving element array (line). Therefore, in the read data, an electrical signal output from one line includes signals of the plurality of colors. FIG. 6A is an explanatory diagram of the read data. As illustrated in FIG. 6A, in the original image read by the lines L1 to L3, the pixels of R, G, and B are repeated in the main scanning direction on each line. The original image exhibits the order of R, B, and G in the sub-scanning direction. The pixel order sorter 301 sorts the read data exhibiting such arrays for each pixel array of the same color so that pixels of the same color are adjacent to each other in the main scanning direction, as illustrated in FIG. 6B. With such sorting, it is possible to easily conduct subsequent abnormal pixel detection processing and subsequent abnormal pixel correction processing.

As illustrated in FIG. 6A, in a case when foreign matter 701 adheres to the reading position of the middle line L2 within a range of a main scanning position x=3 to 5, an image of the foreign matter 701 is separated into the respective colors through the sorting, as illustrated in FIG. 6B. In FIG. 6B, the image of the foreign matter 701 is separated into a pixel 702 of red (R) at the main scanning position x=4, a pixel 703 of green (G) at the main scanning position x=5, and a pixel 704 of blue (B) at the main scanning position x=3. Hitherto, it is difficult to distinguish an image (having, for example, a three-pixel width) of a thin line on the original 103 and an image (having, for example, a three-pixel width) caused by the foreign matter 701 from each other, and a complicated algorithm is used for making the distinction. For example, even when there is a thin line having a one-pixel width on the original 103, edge parts are blurred due to an influence of an optical system including a lens, and read as an image having a width of three pixels. Through the use of the line sensors 127 and 137 of this embodiment, or other such line sensors, the image caused by the foreign matter 701 is separated into one-pixel widths. It is normally difficult to assume that the thin line on the original 103 is read as an image having a one-pixel width. Therefore, it becomes easier to distinguish the image of the thin line on the original 103 and the image caused by the foreign matter 701 from each other, which improves accuracy in the detection of an abnormal pixel.

The abnormal pixel detector 302 conducts processing for detecting an abnormal pixel based on the read data (sorted data) sorted by each color by the pixel order sorter 301 (Step S602). The abnormal pixel detector 302 generates the abnormal pixel information representing a result of detecting the abnormal pixel. FIG. 6C is an explanatory diagram of the abnormal pixel information.

As illustrated in FIG. 6C, the abnormal pixel information generated by the abnormal pixel detector 302 is expressed by a flag having one bit corresponding to each pixel in the main scanning direction. In this example, the flag is set to "1" for an abnormal pixel, and is set to "0" for a normal pixel. Pieces of abnormal pixel information corresponding to the respective colors of R, G, and B are set as flag_r, flag_g, and flag_b, respectively. The values of the respective flags at the main scanning position x=i are expressed as flag_r[i], flag_g[i], and flag_b[i]. The values of the flags are set to "1" at the positions corresponding to the pixels 702, 703, and 704 turned into the abnormal pixels due to the foreign matter 701. That is, in the abnormal pixel information, flag_r[4], flag_g[5], and flag_b[3] are set to "1", and indicate positions 705, 706, and 707, respectively, of the abnormal pixels in the main scanning direction. The processing for detecting an abnormal pixel is described later in detail.

The abnormal pixel information combining unit 303 combines the pieces of abnormal pixel information on the respective colors generated by the abnormal pixel detector 302 (Step S603). The abnormal pixel information combining unit 303 performs a logical OR operation on the values of the pieces of abnormal pixel information at the same main scanning position, to thereby generate the combined abnormal pixel information obtained by combining the pieces of abnormal pixel information. For example, in a case when the combined abnormal pixel information obtained by combining the pieces of abnormal pixel information on the respective colors of R, G, and B is set as flag_rgb, flag_rgb[i] at the main scanning position x=i is expressed by the following expression:

flag_rgb[i]=flag_r[i]|flag_g[i]|flag_b[i]

where a|b represents a logical OR between a and b.

When the pieces of abnormal pixel information flag_r, flag_g, and flag_b of FIG. 6C are combined, the combined abnormal pixel information flag_rgb is calculated, as illustrated in FIG. 6D. The combined abnormal pixel information flag_rgb of FIG. 6D has a value set to "1" at the main scanning position x=3 to 5, the value indicating the abnormal pixel. At a main scanning position 708 (where the value is "1") of FIG. 6D, the width and the position in the main scanning direction is the same as those of the foreign matter 701 of FIG. 6A. Therefore, when foreign matter 701 adheres to the reading position of the line sensor 127, it is possible to accurately grasp the width of each of the foreign matter 701 in the main scanning direction and the amount of the foreign matter 701 by counting of the number of pieces of combined abnormal pixel information flag_rgb having the value of "1", which are generated through the combination among the respective colors, and counting of the width in the main scanning direction exhibited in a case when the value is "1". The abnormal pixel counter 304 counts the width (the number of pixels) in the main scanning direction exhibited in a case when the value of the combined abnormal pixel information flag_rgb generated by the abnormal pixel information combining unit 303 is "1" (Step S604). A result of the counting is used as the count value of the abnormal pixels, which is acquired by the CPU 201 in Step S504.

In parallel with the processing conducted by the abnormal pixel information combining unit 303 and the abnormal pixel counter 304, the abnormal pixel corrector 305 corrects the abnormal pixels within the read data (sorted data) based on the pieces of abnormal pixel information on the respective colors generated by the abnormal pixel detector 302 (Step S605). The abnormal pixels 702, 703, and 704 of FIG. 6B are corrected based on the positions 705, 706, and 707 indicated by the pieces of abnormal pixel information flag_r, flag_g, and flag_b of FIG. 6C. With a related-art line sensor configured to read an image of one color by one line, the image of foreign matter is not separated into different colors. When there is foreign matter having a size of three pixels in the main scanning direction in the same manner as the foreign matter 701 of FIG. 6A, the three pixels are detected as the abnormal pixels. In order to correct the abnormal pixels having three pixels in one line, three pixels in three channels at the main scanning position x=3 to 5, that is, a total of nine pixels, are set as a subject to be corrected, to thereby allow such correction as to prevent a correction trace from being colored. With the line sensor of this embodiment configured to read a plurality of colors by one line, the image of foreign matter is separated into different colors. As illustrated in FIG. 6B, the subject to be corrected has only three pixels in total, including the pixel of R at the main scanning position x=4, the pixel of G at the main scanning position x=5, and the pixel of B at the main scanning position x=3, which endows the line sensor of this embodiment with a feature that the correction involves little image deterioration. Hitherto, three pixels of one color are corrected due to the foreign matter 701 of FIG. 6A, and a boundary with an uncorrected adjacent image becomes distinct, which causes the correction trace to become conspicuous. In this embodiment, the correction is conducted for all of the colors, which can cause the correction trace to become inconspicuous. The correction of the abnormal pixel is described later in detail.

In this manner, the image processing ASIC 202 conducts the counting of the abnormal pixel and the correction of the abnormal pixel, and brings the image processing to an end. The read data (sorted data) subjected to the correction of the abnormal image is transmitted to the image forming apparatus 150 as the image data.

Figure 7A:
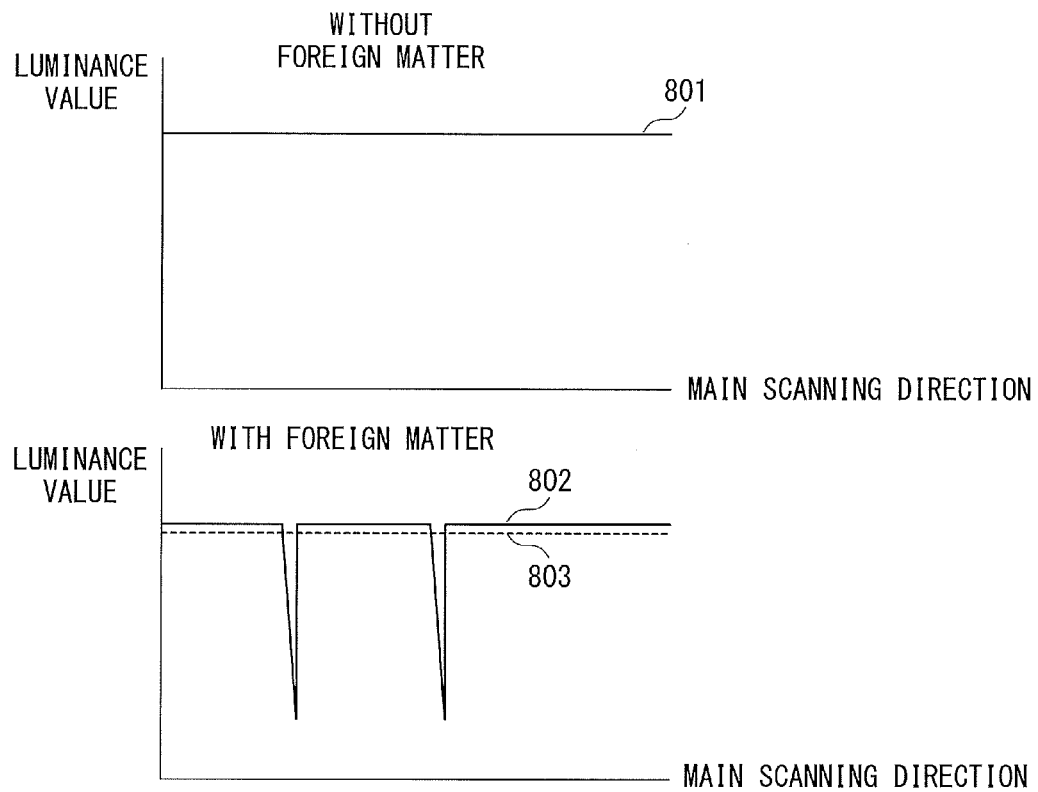
FIG. 7A and FIG. 7B are explanatory diagrams of abnormal pixel detection processing.
Figure 7B:
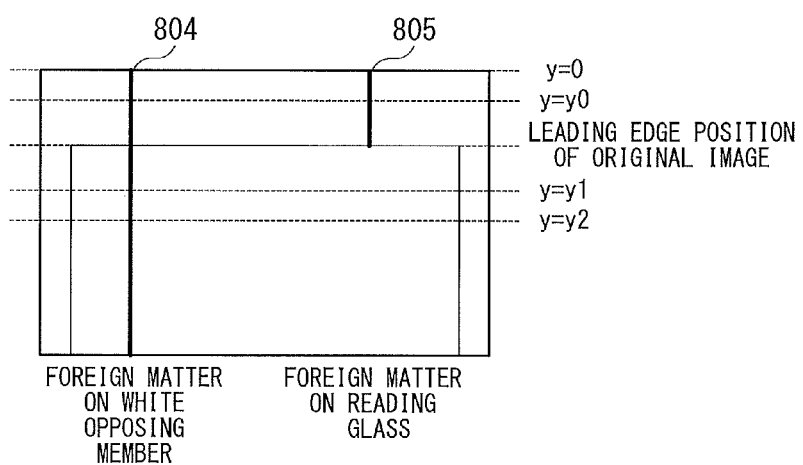

FIG. 7A and FIG. 7B are explanatory diagrams of the abnormal pixel detection processing conducted in Step S602.

FIG. 7A is an illustration of a luminance value obtained when the white opposing member 119 is read by the line sensor 127. When there is no foreign matter, a luminance value 801 is a substantially constant value at a high level. When there is foreign matter, a reflected light amount is reduced due to the foreign matter, and hence, a luminance value 802 is a value at a level lower than that exhibited when there is no foreign matter. The abnormal pixel detector 302 stores in advance a predetermined luminance value 803 obtained by adding a margin to the luminance value 801 of a case when the white opposing member 119 is read without foreign matter. The predetermined luminance value 803 is an abnormal pixel threshold value for detecting the abnormal pixel. The abnormal pixel detector 302 determines the abnormal pixel by comparing a luminance value indicated by the read data (sorted data) with the predetermined luminance value 803. For example, the abnormal pixel detector 302 determines that a relevant pixel is an abnormal pixel candidate in a case when the luminance value indicated by the read data (sorted data) is equal to or less than the predetermined luminance value 803, and determines that the relevant pixel is the normal pixel in a case when the luminance value is greater than the predetermined luminance value 803.

The original 103 passes through a position between the reading glass 120 and the white opposing member 119, and hence, the foreign matter adhering to the white opposing member 119 is screened by the original 103, and does not cause the occurrence of a streaked image in the read original image. When foreign matter adheres to the reading glass 120, a streaked image extending in the sub-scanning direction occurs in the read original image. Therefore, the abnormal pixel candidate due to the foreign matter adhering to the white opposing member 119 is handled as the normal pixel that is not to be corrected, and only the abnormal pixel candidate due to the foreign matter adhering to the reading glass 120 is handled as the abnormal pixel to be corrected. FIG. 7B is the explanatory diagram of the streaked image that differs depending on the position to which the foreign matter adheres. When the foreign matter adheres to a surface of the reading glass 120, the foreign matter appears as a solid line 804 that continuously extends without a gap in the sub-scanning direction of the read image. When the foreign matter adheres to the white opposing member 119, the foreign matter appears as a solid line 805 that extends in the sub-scanning direction of the read image up to a leading edge position of the original image, and does not appear in the original image.

The abnormal pixel detector 302 determines the normal pixel and the abnormal pixel based on such a difference in the sub-scanning direction, from among the abnormal pixel candidates determined based on the luminance values. Specifically, when the abnormal pixel candidates continuously extend in the sub-scanning direction across a boundary of the original image, the abnormal pixel detector 302 determines that the relevant pixel is the abnormal pixel due to the foreign matter adhering to the reading glass 120. When there are no abnormal pixel candidates extending in the sub-scanning direction across the boundary of the original image, the abnormal pixel detector 302 determines that the relevant pixel is the normal pixel due to the foreign matter adhering to the white opposing member 119.

Figure 8:
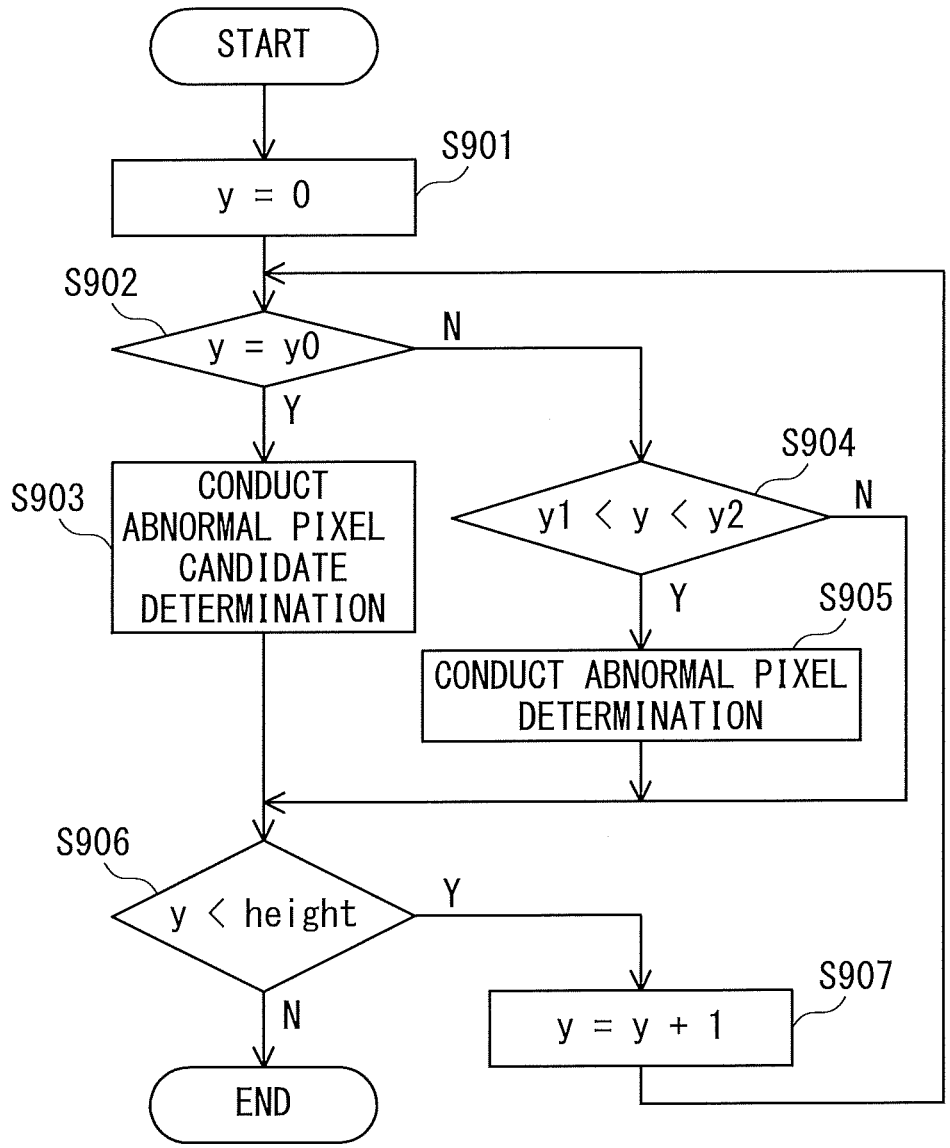
FIG. 8 is a flowchart for illustrating the abnormal pixel detection processing.

FIG. 8 is a flowchart illustrating such abnormal pixel detection processing. The abnormal pixel detector 302 conducts the processing for detecting an abnormal pixel in order from a leading edge side in the sub-scanning direction.

The abnormal pixel detector 302 initializes a sub-scanning counter y (Step S901). With this processing, the sub-scanning counter y is set to "0". As illustrated in FIG. 7B, the sub-scanning counter y represents the position of the read image (range including the original image) in the sub-scanning direction. The abnormal pixel detector 302 determines whether or not the sub-scanning counter y indicates a position y0 set in advance ahead in the sub-scanning direction of a leading edge of the original image in the sub-scanning direction (Step S902). The position y0 represents a range from the leading edge of the read image in the sub-scanning direction to the leading edge of the original image in the sub-scanning direction, and is a value of the sub-scanning counter y within the above-mentioned range.

In a case when the sub-scanning counter y indicates the position y0 (Y in Step S902), the abnormal pixel detector 302 conducts abnormal pixel candidate determination for one line within an area ahead of the leading edge of the original image in the sub-scanning direction, that is, an area where the sub-scanning counter y indicates y0 (Step S903). The abnormal pixel candidate determination processing is described later in detail.

In a case when the sub-scanning counter y does not indicate the position y0 (N in Step S902), the abnormal pixel detector 302 determines whether or not the sub-scanning counter y indicates a value within a range between positions y1 and y2 set within the area of the original image in the sub-scanning direction (Step S904), where the value y2 is greater than the value y1. In a case when the sub-scanning counter y indicates a value within the range between the positions y1 and y2 (Y in Step S904), the abnormal pixel detector 302 conducts abnormal pixel determination for a plurality of lines within the range between the positions y1 and y2, and compares a result thereof with the result of the abnormal pixel candidate determination processing, to thereby determine a final abnormal pixel (Step S905). The abnormal pixel determination processing is described later in detail.

After the abnormal pixel candidate determination processing, after the abnormal pixel determination processing, or in a case when the sub-scanning counter y does not indicate a value within the range between the positions y1 and y2 (N in Step S904), the abnormal pixel detector 302 determines whether or not the sub-scanning counter y indicates a value smaller than a sub-scanning size "height" (Step S906). The sub-scanning size "height" represents the final trailing edge of the area read by the line sensor 127 in the sub-scanning direction. In a case when the sub-scanning counter y exhibits a value less than the sub-scanning size "height" (Y in Step S906), the abnormal pixel detector 302 increments the sub-scanning counter y to repeatedly conduct the processing of Step S902 and the subsequent steps (Step S907). In a case when the sub-scanning counter y exhibits a value equal to or greater than the sub-scanning size "height" (N in Step S906), the abnormal pixel detector 302 brings the abnormal pixel detection processing to an end. With the above-mentioned processing, the abnormal pixel detector 302 detects the abnormal pixel.

Figure 9:
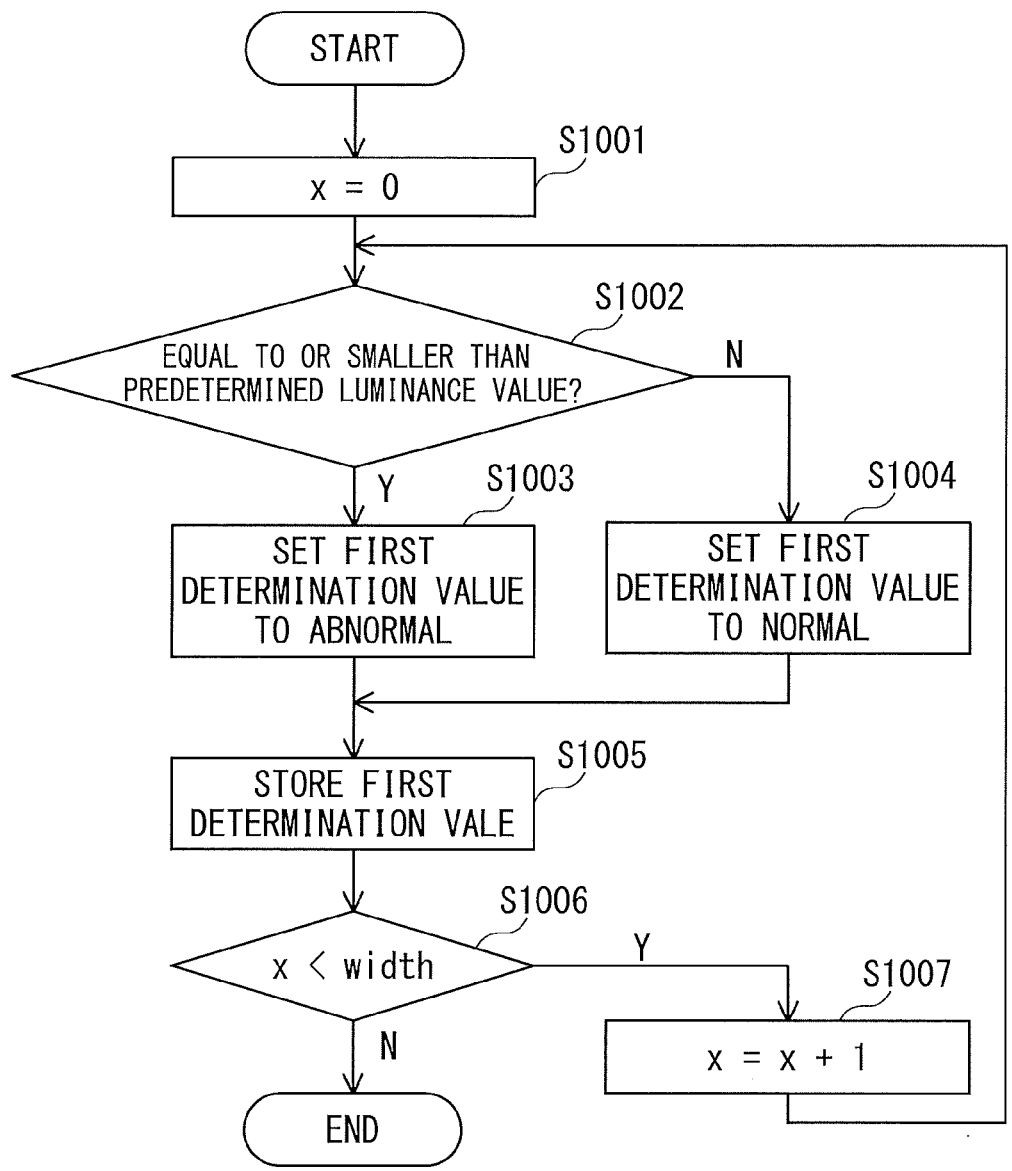
FIG. 9 is a flowchart for illustrating abnormal pixel candidate determination processing.

FIG. 9 is a flowchart illustrating the abnormal pixel candidate determination processing conducted in Step S903. The abnormal pixel detector 302 conducts processing for determining the abnormal pixel candidate for each pixel in order from the edge portion in the main scanning direction.

The abnormal pixel detector 302 initializes the main scanning counter x (Step S1001). With this processing, the main scanning counter x is set to "0". The main scanning counter x represents the position of the read image (range including the original image) in the main scanning direction. The abnormal pixel detector 302 determines whether or not the luminance value of a pixel of interest is equal to or smaller than the predetermined luminance value 803 (Step S1002).

In a case when the luminance value of the pixel of interest is equal to or less than the predetermined luminance value 803 (Y in Step S1002), the abnormal pixel detector 302 sets a value indicating the abnormal pixel as a first determination value of the pixel of interest (Step S1003). In this embodiment, the first determination value is set to "1". In a case when the luminance value of the pixel of interest is greater than the predetermined luminance value 803 (N in Step S1002), the abnormal pixel detector 302 sets a value indicating the normal pixel as the first determination value of the pixel of interest (Step S1004). In this embodiment, the first determination value is set to "0". The abnormal pixel detector 302 stores the first determination value set to any one of the above-mentioned values in a memory for each position (pixel) in the main scanning direction (Step S1005).

The abnormal pixel detector 302 determines whether or not the main scanning counter x exhibits a value less than a main scanning size "width" (Step S1006). The main scanning size "width" represents an edge portion of the area read by the line sensor 127 in the main scanning direction. In a case when the main scanning counter x is less than the main scanning size "width" (Y in Step S1006), the abnormal pixel detector 302 increments the main scanning counter x to repeatedly conduct the processing of Step S1002 and the subsequent steps (Step S1007). In a case when the main scanning counter x exhibits a value equal to or greater than the main scanning size "width" (N in Step S1006), the abnormal pixel detector 302 brings the abnormal pixel candidate determination processing to an end. With the above-mentioned processing, the abnormal pixel detector 302 conducts the determination of the abnormal pixel candidate.

Figure 10:
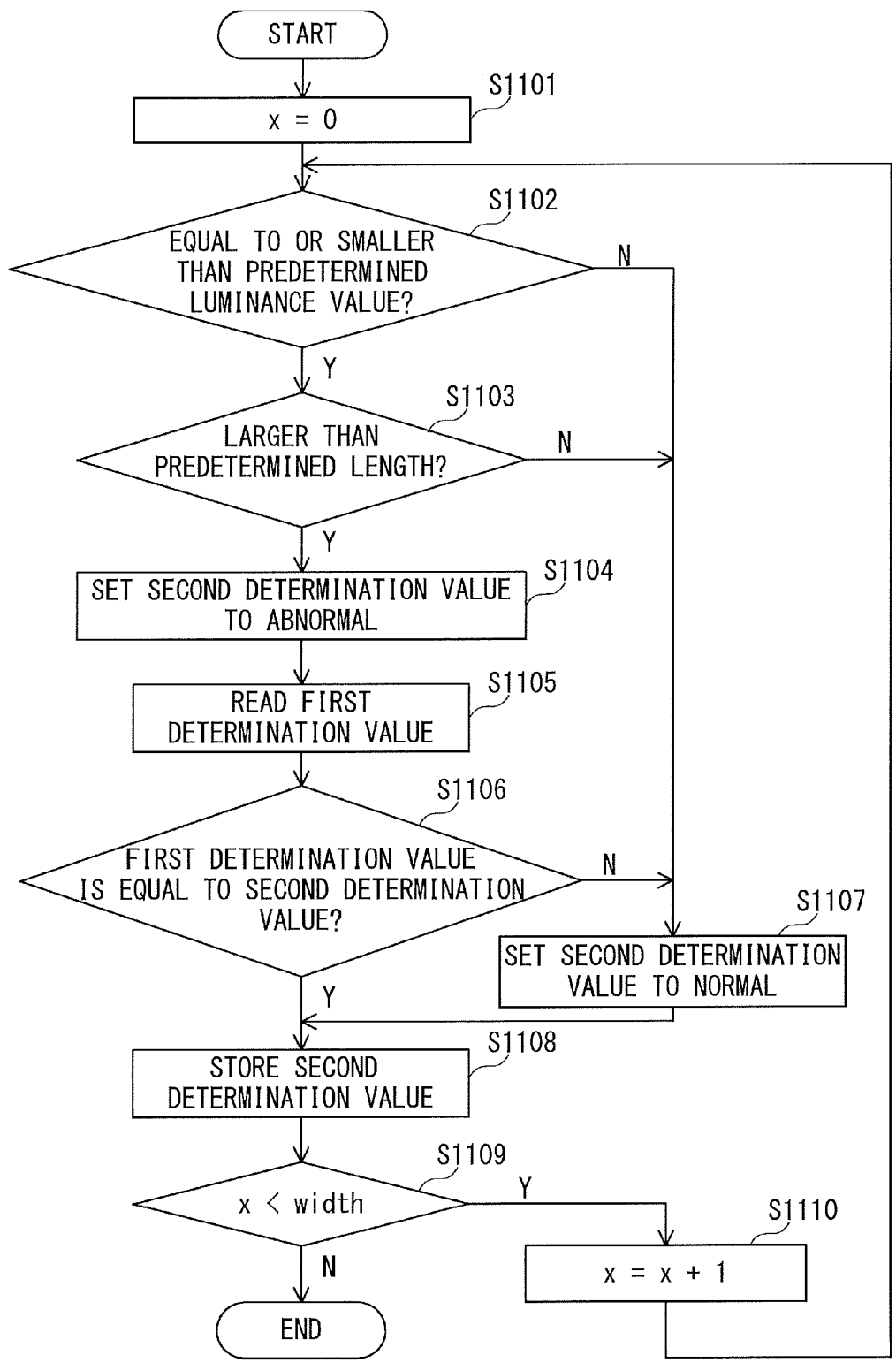
FIG. 10 is a flowchart for illustrating abnormal pixel determination processing.

FIG. 10 is a flowchart for illustrating the abnormal pixel determination processing conducted in Step S905. The abnormal pixel detector 302 conducts processing for determining the abnormal pixel for each pixel in order from the edge portion in the main scanning direction. The processing of Step S1101 and Step S1102 is the same as the processing of Step S1001 and Step S1002 of FIG. 9, and hence, a description thereof is omitted.

The abnormal pixel detector 302 counts the number of pixels being the abnormal pixel candidates continuously extending in the sub-scanning direction, and determines whether or not the abnormal pixel candidates continuously extend in the sub-scanning direction by a length greater than a predetermined length (Step S1103). This is processing for discriminating between pixels obtained by reading a ruled line or a character within the original image and the abnormal pixels due to the foreign matter. The abnormal pixels due to the foreign matter appear in the sub-scanning direction over the entire area of the read image, and hence, the abnormal pixel detector 302 handles pixels determined to be abnormal in the sub-scanning direction over the entire area of the read image as the abnormal pixel candidates, and handles pixels determined otherwise as the normal pixels.

When the abnormal pixel candidates continuously extend in the sub-scanning direction by a length greater than the predetermined length (Y in Step S1103), the abnormal pixel detector 302 sets the value indicating the abnormal pixel as a second determination value of the relevant pixel (Step S1104). In this embodiment, the second determination value is set to "1". The abnormal pixel detector 302 reads the first determination value corresponding to the pixel at the main scanning position x from the memory (Step S1105). The abnormal pixel detector 302 determines whether or not the first determination value and the second determination value are the same value (Step S1106).

When the first determination value and the second determination value are not the same value (N in Step S1106), the abnormal pixel detector 302 sets the value indicating the normal pixel as the second determination value of the relevant pixel (Step S1107). In this embodiment, the second determination value is set to "0". When the luminance value of the pixel of interest is greater than the predetermined luminance value 803 (N in Step S1102), or when the abnormal pixel candidates do not continuously extend in the sub-scanning direction by a length greater than the predetermined length (N in Step S1103), the abnormal pixel detector 302 also sets the value indicating the normal pixel as the second determination value of the relevant pixel (Step S1107). The abnormal pixel detector 302 stores the second determination value ("0" in this case) set to any one of the above-mentioned values in the memory for each position (pixel) in the main scanning direction (Step S1108).

When the first determination value and the second determination value are the same value (Y in Step S1106), the abnormal pixel detector 302 stores the second determination value ("1" in this case) set to any one of the above-mentioned values in the memory for each position (pixel) in the main scanning direction (Step S1108).

The processing of Step S1109 and Step S1110 is the same as the processing of Step S1006 and Step S1007 of FIG. 9, and hence, a description thereof is omitted. With the above-mentioned processing, the abnormal pixel detector 302 can accurately conduct the determination of the abnormal pixel. The second determination value stored in the memory is used as the abnormal pixel information as it is.

Figure 11:
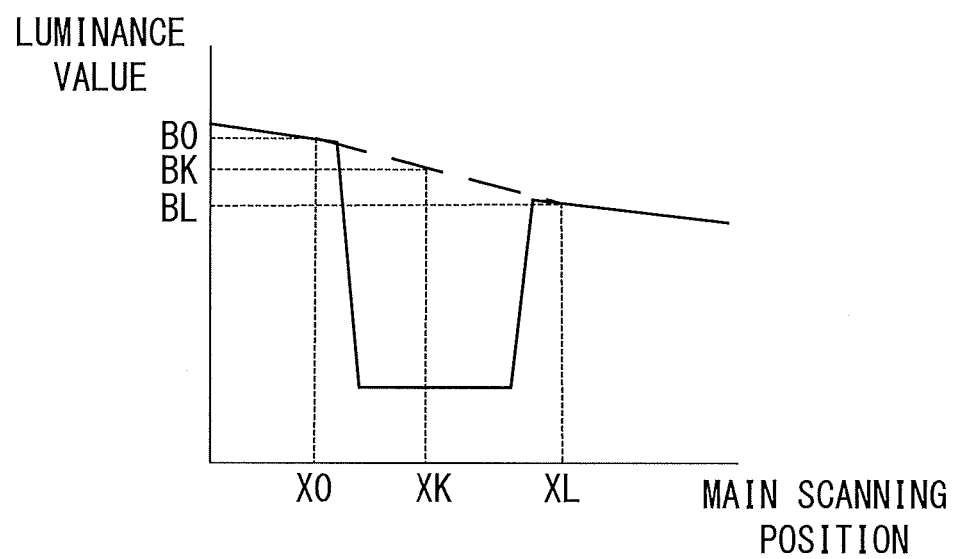
FIG. 11 is an explanatory diagram of correction processing for an abnormal pixel.
Figure 12A:
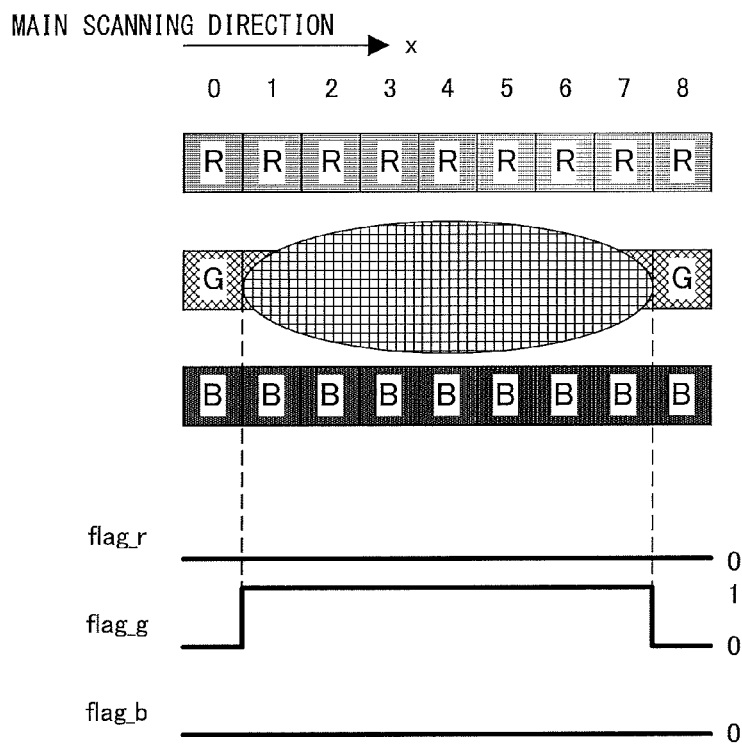
FIG. 12A and FIG. 12B are explanatory diagrams of reading results obtained by an image reading apparatus.
Figure 12B:
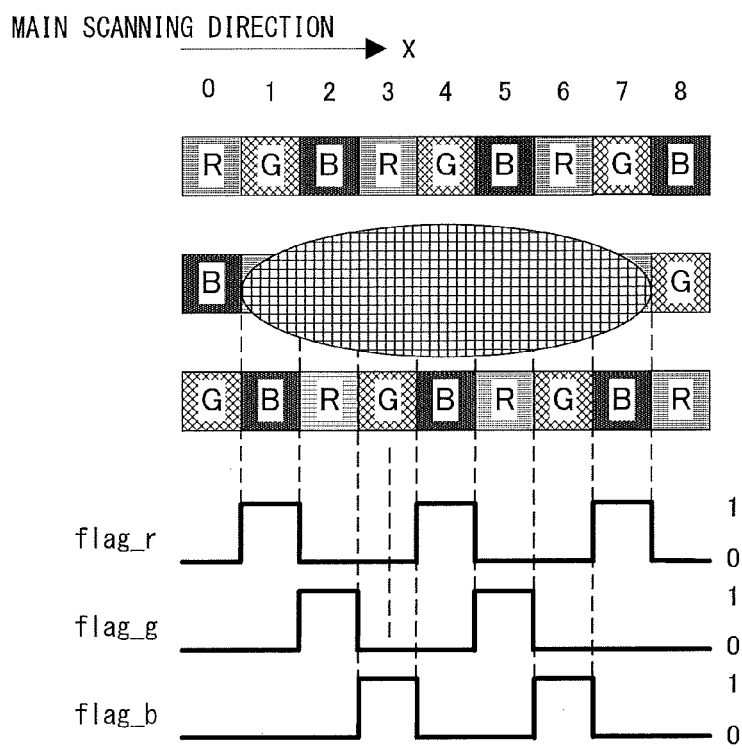

FIG. 11 is an explanatory diagram of the processing for correcting the abnormal pixels conducted in Step S605 of FIG. 5. The abnormal pixels are corrected by subjecting pixels over an entire correction area to linear interpolation through the use of boundary pixels being pixels adjacent to the correction area. In FIG. 11, the correction area that has been determined to include the abnormal pixels, and is to be corrected by the abnormal pixel corrector 305, corresponds to a range of from a pixel XO to a pixel XL in the main scanning direction. The luminance value within the correction area is expressed by a luminance value B0 of the pixel X0 and a luminance value BL of the pixel XL, the pixel X0 and the pixel XL being pixels at the boundaries of the correction area. In this case, a correction value BK for a luminance value of a pixel XK within the correction area is expressed by the following expression:

$$Bx=(BL-B0)\cdot(XK-X0)/(XL-X0)+B0.$$

The abnormal pixel corrector 305 uses the above-mentioned expression to correct the luminance values of all the pixels within the correction area. The corrected read data is transmitted from the image processing ASIC 202 to the image forming apparatus 150 as the image data.

In this embodiment, the detection of the foreign matter is conducted by reading the white opposing members 119 and 129 and the leading edge of the original image in the main scanning direction, but may be conducted based on only the results of reading the white opposing members 119 and 129.

According to the image reading apparatus 100 described above, even when the image reading is conducted through use of the line sensors 127 and 137 in which the respective light receiving elements for R, G, and B are arranged in a staggered shape, it is possible to accurately detect foreign matter, for example, dust, adhering to the reading position. Further, the abnormal image due to the foreign matter is separated into the respective colors, and hence, the image reading apparatus 100 can correct the read image while preventing the correction trace from becoming conspicuous. In this manner, even when the image is read by the line sensor using the light receiving element array formed by arranging the first light receiving element and the second light receiving element in the first direction, the image reading apparatus 100 can accurately detect foreign matter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. An image reading apparatus comprising:
at least one processor operatively coupled to a memory, serving as:
(A) a reading unit configured to read an image of an object, the reading unit comprising:
(a) a first line sensor that has a plurality of light receiving elements receiving light of a first color and a plurality of light receiving elements receiving light of a second color that is different from the first color, being arranged in a first direction; and (b) a second line sensor that has a plurality of light receiving elements receiving light of the first color and a plurality of light receiving elements receiving light of the second color, being arranged in the first direction, wherein the first line sensor and the second line sensor are arranged at a predetermined interval in a second direction orthogonal to the first direction;

(B) an abnormal pixel detector configured to detect an abnormal pixel based on pixel data obtained by the reading unit; and (C) a combining unit configured to generate abnormal pixel information by performing a logical OR operation on a detected result of the abnormal pixel detector on a first position in the first direction with respect to the first line sensor and a detected result of the abnormal pixel detector on the first position with respect to the second line sensor.

2. The image reading apparatus according to claim 1, further comprising a sorter configured to generate first color image data for the first color by sorting first pixel data from the light receiving elements receiving light of the first color in the first line sensor and second pixel data from the light receiving elements receiving light of the first color in the second line sensor and configured to generate second color image data for the second color by sorting third pixel data from the light receiving elements receiving light of the second color in the first line sensor and fourth pixel data from the light receiving elements receiving light of the second color in the second line sensor, wherein the abnormal pixel detector is configured to detect a first abnormal pixel for the first color based on the first color image data, and configured to detect a second abnormal pixel for the second color based on the second color image data.

3. The image reading apparatus according to claim 1, further comprising an acquisition unit configured to acquire information indicating a length of the abnormal pixels in the first direction based on the abnormal pixel information.

4. The image reading apparatus according to claim 3, wherein the acquisition unit is configured to acquire the information indicating a length of the abnormal pixels in the first direction by counting a number of successive abnormal pixels in the first direction.

5. The image reading apparatus according to claim 3, further comprising an alert issuer configured to issue an alert in a case when the length of the abnormal pixels, which the information acquired by the acquisition unit indicates, is equal to or longer than a predetermined length.

6. The image reading apparatus according to claim 1, further comprising a corrector configured to correct an abnormal pixel based on a pixel adjacent to a correction area including the abnormal pixel.

7. The image reading apparatus according to claim 1, wherein the abnormal pixel detector is configured to detect the abnormal pixel by comparing read data read by the reading unit with an abnormal pixel threshold value, and the abnormal pixel threshold value is a value based on read data by the reading unit reading a white member provided at the reading position in advance.

8. The image reading apparatus according to claim 7, wherein the abnormal pixel detector is configured to determine an abnormal pixel candidate by comparing the read data with the abnormal pixel threshold value, and to determine that the abnormal pixel candidate is the abnormal pixel in a case when the abnormal pixel candidates continuously extend in the second direction across a boundary of the image of a target object at a position at which the abnormal pixel candidate is positioned in the first direction.

9. The image reading apparatus according to claim 1, wherein (i) the reading unit further comprises a third line sensor that has a plurality of light receiving elements receiving light of the first color, a plurality of light receiving elements receiving light of the second color, and a plurality of light receiving elements receiving light of a third color that is different from either of the first color and the second color, being arranged in the first direction, (ii) the first line sensor further includes a plurality of light receiving elements receiving light of the third color arranged in the first direction, (iii) the second line sensor further includes a plurality of light receiving elements receiving light of the third color arranged in the first direction, and (iv) the first line sensor, the second line sensor, and the third line sensor are arranged at a predetermined interval in the second direction.

10. An image forming apparatus comprising:

at least one processor operatively coupled to a memory, serving as:

a reading unit configured to read an image of an object, the reading unit comprising a first line sensor that has a plurality of light receiving elements receiving light of a first color and a plurality of light receiving elements receiving light of a second color that is different from the first color, being arranged in a first direction, and having a second line sensor that has a plurality of light receiving elements receiving light of the first color and a plurality of light receiving elements receiving light of the second color being arranged at a predetermined interval in the first direction, and the first line sensor and the second line sensor being arranged in a second direction orthogonal to the first direction;

an abnormal pixel detector configured to detect an abnormal pixel based on pixel data obtained by the reading unit;

a combining unit configured to generate abnormal pixel information by performing a logical OR operation on a detected result of the abnormal pixel detected by the abnormal pixel detector on a first position in the first direction with respect to the first line sensor and a detected result of the abnormal pixel detector on the first position with respect to the second line sensor; and an image forming unit configured to form an image on a recording medium based on read data read by the reading unit.

11. An image reading method to be executed by an image reading apparatus, the image reading apparatus comprising a reading unit configured to read an image of an object, the reading unit comprising (i) a first line sensor that has a plurality of light receiving elements receiving light of a first color and a plurality of light receiving elements receiving light of a second color that is different from the first color, being arranged in a first direction, and (ii) a second line sensor that has a plurality of light receiving elements receiving light of the first color and a plurality of light receiving elements receiving light of the second color, being arranged in the first direction, wherein the first line sensor and the second line sensor are arranged at a predetermined interval in a second direction orthogonal to the first direction, the image reading method comprising:

detecting an abnormal pixel based on pixel data obtained by the reading unit; and generating abnormal pixel information by performing a logical OR operation on a detected result detected at a first position in the first direction with respect to the first line sensor and a detected result detected at the first position with respect to the second line sensor.

12. A non-transitory computer readable storage medium having stored thereon a computer program for a computer, the computer comprising a reading unit configured to read an image of an object, the reading unit comprising a first line sensor that has a plurality of light receiving elements receiving light of a first color and a plurality of light receiving elements receiving light of a second color that is different from the first color, being arranged in a first direction, and a second line sensor that has a plurality of light receiving elements receiving light of the first color and a plurality of light receiving elements receiving light of the second color being arranged at a predetermined interval in the first direction, wherein the first line sensor and the second line sensor are arranged in a second direction orthogonal to the first direction, the computer program causing the computer:

to detect an abnormal pixel based on pixel data obtained by the reading unit; and to generate abnormal pixel information by performing a logical OR operation on a detected result detected at a first position in the first direction with respect to the first line sensor and a detected result detected at the first position with respect to the second line sensor.

* * * * *